United States Patent Office 3,099,693
Patented July 30, 1963

3,099,693
TETRACYCLIC CHLOROCARBONS
Victor Mark, Olivette, Mo., assignor to Monsanto Chemical Company, St. Louis, Mo., a corporation of Delaware
No Drawing. Filed Dec. 29, 1960, Ser. No. 79,113
6 Claims. (Cl. 260—648)

This invention relates to new chemical structures composed solely of carbon and chlorine and to procedures for their preparation. More specifically the invention relates to the tetracyclic chlorocarbons $C_{15}Cl_{12}$ and to the method of preparing them by the dechlorinative trimerization of hexachlorocyclopentadiene.

In accordance with this invention hexachlorocyclopentadiene may be heated in the presence of metallic copper or copper salts to a temperature in excess of 160° C. and preferably to a temperature of 250 to 300° C. A loss of chlorine and a substantial increase in molecular weight takes place in accordance with the following reaction:

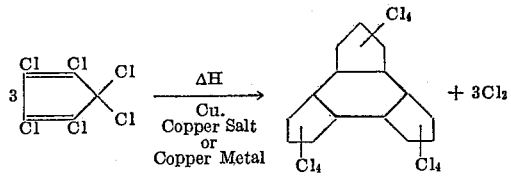

The tetracyclic chlorocarbons, $C_{15}Cl_{12}$, have three five-membered and one six-membered ring fused in a symmetrical fashion and have four chlorine atoms in each of the five-membered rings. They also have six double bonds in the molecule, each cyclopentane ring containing two carbon to carbon double bonds as indicated by the characteristic infrared absorption bands in the 6.0–6.5 micron region, and by their formula of $C_{15}Cl_{12}$, containing four rings, and having the molecular weight of 606.

The novel tetracyclic chlorocarbon skeleton contains six double bonds in several possible isomeric arrangements, and the dechlorination of hexachlorocyclopentadiene may yield all of the possible isomeric products as represented by the collective formula above. Any and all of these $C_{15}Cl_{12}$ tetracyclic isomers are valuable and useful compounds as described hereinafter. Under careful operation it is possible to isolate the isomer having the following structure

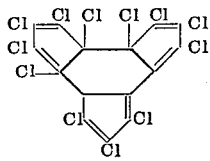

in the form of a pale yellow crystalline compound that has a high melting point and represents the major isomer present in the reaction mixture. It is possible, however, to use the crude reaction product, comprising isomers of different double-bond distributions for the purpose of transforming it into valuable end products. Due to the possibility of the facile and unpredictable allylic rearrangements, which depend on the nature of the reagents and are well known in the chemical literature, the definition of the exact relative positions of the double bonds in the isomeric products is difficult by chemical means. For the reason of the ready migration of the double bonds in the reactions of the $C_{15}Cl_{12}$ isomers it is not necessary to separate the individual isomeric entities before carrying out the reactions because, due to the ready isomerization, all of the isomers could yield the same end product.

The reaction can be carried out in the presence and in the absence of solvents, and at, above and below atmospheric pressure. The use of high boiling neutral solvents, such as tri- and tetrachlorobenzene, polychlorobiphenyl, chlorodiphenylether is beneficial in moderating the reaction and avoiding superheating. Excess of hexachlorocyclopentadiene can, of course, be substituted for a solvent.

As indicated by the stoichiometric equation above the formation of every molecule of the $C_{15}Cl_{12}$ compound requires the consumption of the three molecules of hexachlorocyclopentadiene and the liberation of three molecules of chlorine gas. The faster and the more efficiently the chlorine is eliminated from the system the better the trimerization will take place. For this reason the application of partial vacuum might be beneficial in the operation. The liberation of chlorine is also greatly facilitated by the use of appropriate catalysts. The use of metallic copper and of cuprous and cupric salts seems to be uniquely effective in catalytic dehalogenations due to the small amounts of catalyst required the reaction can conveniently be carried out in a copper container without the addition of copper salts.

The products of the dechlorinative trimerization of hexachlorocyclopentadiene were found to be useful intermediates in the preparation of valuable derivatives. All of the $C_{15}Cl_{12}$ chlorocarbons of the above skeleton possesses active allylic chlorines that can be eliminated with the use of chemical dechlorinative agents. Thus the reaction products of $C_{15}Cl_{12}$ with trivalent phosphorus esters are deep purple crystalline products, readily soluble in hydrocarbons, chlorocarbons and oxygenated solvents and can be used as dyes and pigments to prepare colored plastics, paints, solutions and the like.

Further details in the preparation of the new intermediate tetracyclic chlorocarbons are set forth in the following specific examples:

*Example I*

Hexachlorocyclopentadiene, 273 g. was charged to a 500 ml. three-neck flask provided with thermometer, stirrer and reflux condenser and, after the addition of 5 g. of copper powder, the well stirred slurry was refluxed for a period of 20 hours. The boiling point of 235° C. increased slowly during the heating and the copper powder disappeared giving place to cuprous chloride. After cooling to room temperature carbon tetrachloride was added to the flask and brought to reflux. The hot solution was decanted and yielded, after cooling, pale brown crystals that were recrystallized from fresh solvent.

Analysis for $C_{15}Cl_{12}$: Calculated: C, 29.75%; H, 0.0%; Cl, 70.25%. Found: C, 29.24%; H, 0.02%; Cl, 70.15%. Molecular weight: calculated 605.6; found 564 (by boiling point elevation in benzene), 550 (by cryoscopy in camphor, Rast).

*Example II*

The procedure of Example I was repeated except that the heating was carried out in an all-copper equipment. Workup of the thick liquid yielded brown crystals, identical with those described in the first example.

*Example III*

The procedure of Example I was repeated except that cuprous chloride, 10 g. was substituted for the copper powder. A substantial yield of the $C_{15}Cl_{12}$ tetracyclic chlorocarbon was isolated from the reaction mixture.

The embodiments of the invention in which an exclusive property or privilege is claimed are defined as follows:

1. A chlorocarbon having the empirical formula of $C_{15}Cl_{12}$ and the following structure

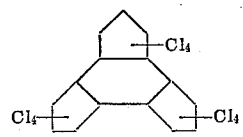

in which each five membered ring has two double bonds.

2. A chlorocarbon having the empirical formula of $C_{15}Cl_{12}$ and the following structure

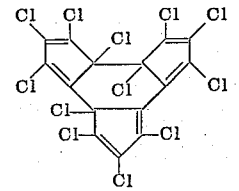

3. The method of preparing a chlorocarbon of the empirical formula $C_{15}Cl_{12}$ which comprises heating hexachlorocyclopentadiene at a temperature above 160° C. in the presence of a catalyst selected from the group consisting of copper metal and cuprous chloride.

4. The method of preparing the compound of the structure

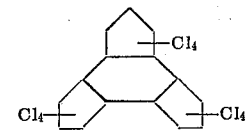

in which each five membered ring has two double bonds, which comprises heating hexachlorocyclopentadiene at a temperature above 160° C. in the presence of metallic copper.

5. The method of preparing the compound of the structure

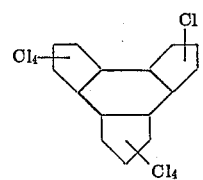

in which each five membered ring has two double bonds, which comprises heating hexachlorocyclopentadiene at a temperature above 160° C. in the presence of cuprous chloride.

6. The method of preparing a compound of the structure

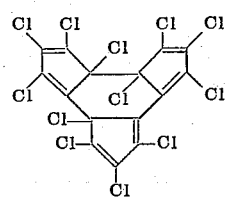

which comprises heating hexachlorocyclopentadiene at a temperature above 160° C. in the presence of copper.

References Cited in the file of this patent

UNITED STATES PATENTS 2,732,409    Ladd ------------------ Jan. 24, 1956

OTHER REFERENCES

McBee et al.: "Jour. Am. Chem. Soc.," vol. 77 (1955), pages 4375–9.

Roedig et al.: "Angewandte Chemie," vol. 67 (1955), pages 302–3.